Patented Nov. 16, 1948

UNITED STATES PATENT OFFICE 2,453,850

LUBRICATING COMPOSITIONS

Louis A. Mikeska and Allen R. Kittleson, Westfield, N. J., and Warren M. Smith, Baton Rouge, La., assignors to Standard Oil Development Company, a corporation of Delaware No Drawing. Application December 3, 1941, Serial No. 421,454

3 Claims. (Cl. 252—51.5)

This invention relates to the improvement of hydrocarbon oil compositions by the addition thereto of a new class of improving agents which may be described broadly as complex condensation products of hydroxyarylalkyl amines.

In the development of petroleum lubricating oils, the trend has been to use more and more efficient refining methods in order to reduce the tendency of the oils to form carbon and deposits of solid matter or sludge. While such highly refined oils possess many advantages, they are less effective in protecting the metal surfaces which they contact against rusting and corrosion due to oxygen and moisture, and are more prone to form acidic oxidation products which also are corrosive. It has now been found that this rusting and corrosion of metals can be greatly reduced by adding to the oils a small proportion of an oil-soluble condensation product of a hydroxyarylalkyl amine. These agents are also effective in improving other characteristics of hydrocarbon oils and reduce their rate of oxidation, increase their color stability, etc., as will be shown below.

A preferred type of condensation product for use in this invention is prepared as the ammonium derivatives of alkyl phenol-formaldehyde-hydrogen halide condensation products. These compounds are obtained with satisfactory oil solubility and effectiveness for the purpose of this invention by condensing an alkyl phenol with formaldehyde in the presence of a hydrogen halide, then reacting the resulting phenolic condensation product with ammonia or other strong base, e. g., an amino compound or other organic nitrogen base. Ammonia is the preferred base reactant. Next in order come the aliphatic amines and aromatic amines, primary, secondary and tertiary. The solubility of these products in hydrocarbon oils varies with the degree of condensation or resinification of the reaction products, the simplest products of reaction often being very slightly soluble. Their solubility and effectiveness are readily increased by subjecting them to condensation and/or polymerization conditions during their preparation, or the simple reaction products may be prepared and thereafter subjected to condensation and/or polymerization treatment. The increase in the oil solubility of these products is also desirable in that it makes possible the preparation of liquid concentrates containing relatively large proportions, such as 25% or more, of the improving agents of this invention dissolved in a hydrocarbon oil; this concentrated solution being conveniently used for blending purposes.

Another very important factor in the preparation and use of these agents is that their oil-solubility increases with the length of the alkyl substituent in the phenol nucleus.

Even though the initial phenolic compound may contain a long alkyl or aliphatic substituent group, which in ordinary types of reaction lowers the reactivity of the phenolic compounds, the reaction for preparing the desired agent goes with great ease. The complete reaction may be considered as involving two stages: first, a substitution of a halogenated aliphatic radical in the phenolic compound; and second, a splitting out of the halogen by condensation of the substituted phenolic compound with the base. Very little halogen, and preferably none, is left in the final product. The preparation of the preferred agents is illustrated by the following:

Example 1

900 grams of paraformaldehyde (30 mols of formaldehyde) and 5,000 grams of concentrated hydrochloric acid were placed in a 12-liter flask provided with a stirrer, a reflux condenser and a thermometer. A solution of 2,060 grams (10 mols) of para-iso-octylphenol (para-tetramethyl butyl phenol) in an equal weight of benzene was then added to the flask over a period of 20 to 25 minutes, while passing dry hydrochloric acid gas continuously through the solution throughout the reaction in order to keep the reaction mixture saturated. The stirrer was also operated continuously to provide efficient contact between the two liquid phases present during the reaction. The temperature of the initial mixture of paraformaldehyde and hydrochloric acid was 15° C. It increased to 45–50° C. upon addition of the phenol and this temperature was thereafter maintained for 1½ hours while constantly stirring and passing in hydrochloric acid gas. At the end of this time the stirring was stopped, an upper phenolic benzene layer separated from a lower fuming hydrochloric acid layer and was separately withdrawn from the reaction vessel. The upper layer, after washing and removal of the benzene, yielded a viscous light red oil, crystallizing partly on standing. Analysis of a small sample of this oil indicated it to contain 14.2% chlorine.

To 600 grams of this benzene solution there were slowly added (with thorough stirring) 50 grams of anhydrous ammonia dissolved in 300 grams of 98% isopropyl alcohol. This reaction took place with great evolution of heat and, on a larger scale, cooling or pressure is necessary to prevent loss of solvent and ammonia. After complete addition of the ammonia, the mixture consisted of a thick, tacky, yellow slurry containing an excess (about 10%) of ammonia. This mixture was then placed in a stainless steel bomb of one liter content which was sealed and then heated for 20 hours at a temperature of 110 to 120° C.

After heating, the reaction product was obtained as a material completely soluble in the benzene-alcohol solvent present which also contained a fine suspension of insoluble ammonium chloride. This mixture was washed with water several times to remove the suspended salt and also the alcohol present. 500 grams of a refined paraffinic lubricating oil having a viscosity Saybolt at 210° F. of 43 seconds were added and the mixture was blown with nitrogen at 120° to 130° C. for two hours to remove the benzene. After this, more oil was added to provide a concentrate of relatively low viscosity and clear red color containing 25% of the reaction product.

A small portion of the benzene solution was withdrawn for analysis prior to addition of the lubricating oil. Evaporation of the benzene produced a brittle, resinous material containing 2.8% nitrogen.

The heating of the ammonia condensation product is necessary in order to obtain a completely oil-soluble final product. The extent of heating required to accomplish this varies with the chlorine content of the intermediate product, materials containing 11% combined chlorine requiring only four to six hours heating, while materials containing 14.2% chlorine require 15 to 20 hours. Materials of still higher chlorine content did not yield completely oil-soluble products by this heat treatment, the degree of insolubility increasing with increase in chlorine content. The preparation of intermediate products containing about 12 to 14% Cl is preferred, as these result in very effective lubricating oil improving agents.

The chlorine content of the intermediate product may be controlled by the ratio of the formaldehyde and phenol used in the initial reaction. For example, when conducting the process as described in Example 1 with several different proportions of formaldehyde and para-iso-octylphenol, the chlorine content of the intermediate product, and the nitrogen content of the final product, were observed to be as follows:

| Formaldehyde, Octyl Phenol, Mols | Intermediate Product, Per Cent Cl | Final Product, Per Cent N |
| --- | --- | --- |
| 1.0 | 2.7 | 0.5 |
| 1.5 | 8.7 | 1.7 |
| 2.0 | 11.9 | 2.4 |
| 2.5 | 13.5 | 2.9 |
| 3.0 (Example 1) | 14.2 | 2.8 |

Instead of washing the heat treated reaction product with water as described above, the suspended ammonium chloride salt may be removed by filtration, preferably by filter pressing the suspension with the addition of a filter aid such as Hyflow. A suitable lubricating oil may then be added to the filtrate (if it is desired to produce directly an oil solution of the final product) and the alcohol-benzene solvent may then be removed by distillation.

Although a very satisfactory procedure for preparing the stabilizing agent has been described with reference to the condensation of a nitrogen base with a condensation product of an alkyl phenol, formaldehyde, and hydrogen chloride, and the further condensation or polymerization of the resulting product, it is to be understood that other procedures may be employed for obtaining blending agents of similar character though the described procedure is preferred. In these precedures the order of the reaction steps may be changed and similar reactants may be used. For example, the formaldehyde or other aldehyde may be first reacted with ammonia, or with a primary, secondary, or tertiary amine to form alkyl-alkylol amines for condensation with the phenol or alkyl phenol; or it may be desired to alkylate the base or the base derivatives of the phenol condensation product, e. g., with an alkylating agent such as diethyl sulfate, an alkyl halide, an alcohol, ketone, or olefin, by known alkylating methods, and with reduction by hydrogen, if needed or desired.

As in the case of many resin preparations, the exact mechanism of the reaction is not entirely understood. In the first stage the alkyl phenol may be regarded as condensing with the reaction product of the hydrogen halide and aldehyde, or, as condensing with formaldehyde, and the condensation product thereof being condensed with the hydrogen halide. The resulting product of this reaction is a complex mixture of various chlormethyl derivatives, having the following general formula:

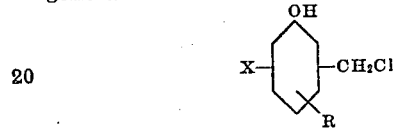

in which the substituent groups may be attached to any position of the aryl nucleus indicated diagrammatically by the hexagon, R represents a hydrocarbon group of at least 2 and preferably an alkyl group of 4 or more carbon atoms, and X represents hydrogen or an organic radical, especially an alkyl, aryl or aralkyl radical which may in turn contain substituent groups. Among the compounds which have been identified as present in the products from such reaction are the following:

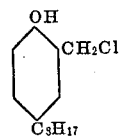

Chlormethyl diisobutyl phenol

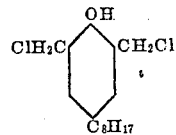

Bis chlormethyl diisobutyl phenol

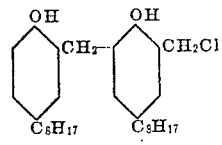

Chlormethyl bis (diisobutyl hydroxy phenyl) methane, and

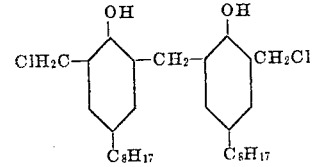

Bis (diisobutyl chlormethyl hydroxy phenyl) methane

In the second stage of reaction, the condensation products of the alkyl phenol, the formaldehyde, and the hydrogen halide split off halogen in undergoing a further condensation with the nitrogen base, and thus, the alkyl phenol radical becomes united with the base radical through the methylene (—CH₂—) group, thereby forming compounds containing the following characteristic group:

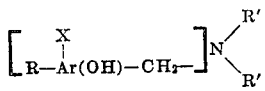

wherein, as before, R—Ar(OH)—represents the alkyl phenol group, X represents H or an organic group and the nitrogen atom N has valences which may be satisfied by hydrogen or organic radicals, (R'), which may represent alkyl, cycloalkyl, aryl, or a hydroxy alkyl benzyl radical, and which may represent similar or different radicals in the molecule, as for example, in the following types of compounds:

R—(X)Ar(OH)—CH₂—NH₂
[R—(X)Ar(OH)—CH₂—]₂NH
[R—(X)Ar(OH)—CH₂—]₃N
R—(X)Ar(OH)—CH₂—N(R')₂
[R—(X)Ar(OH)—CH₂—]₂NR'

The simplest non-resinous compounds containing a single hydroxy benzyl group are not very effective, while those containing at least two hydroxy benzyl radicals in the molecule are more desirable, and the still more complex resinous type of the agents herein disclosed have been found particularly effective as improving agents for lubricating oils. In the case of products prepared from ammonia, this condensation and resinification to form the preferred resinous type of products may take place even on standing at room temperature for a long period of time. It is greatly hastened by heating, and such heating is generally necessary to resinify and to render effective the products prepared from amines.

While the lubricating oil addition agents described above represent a preferred embodiment of this invention, it is also possible to prepare suitable lubricating oil improving agents of somewhat similar characteristics by a number of other methods, of which the following are illustrative:

The hydrogen chloride and formaldehyde may first be reacted to form bis-chlormethyl ethers such as ClCH₂OCH₂Cl and ClCH₂(OCH₂)ₙOCH₂Cl in which n is an integer and these chlorethers may then be caused to react with the phenol. This may be done by passing dry HCl through a suspension of paraformaldehyde in a solvent such as benzene until most of the formaldehyde has reacted with the HCl to give a soluble reaction product. The entire reaction mixture is then heated with the alkyl phenol to give the —CH₂Cl derivative, the reagents being used preferably in a ratio of about 2.5 mol equivalents of formaldehyde per mol of phenol. This intermediate product is reacted with ammonia and heated as in Example 1 to give an oil-soluble product. The bis-chlormethyl ethers may also be prepared by any other suitable method; the mixed ether products may be fractionated to separate substantially pure single ethers, any one of which may be reacted with the phenol. The phenol may also be added to the formaldehyde-benzene mixture and dry HCl passed through this mixture to obtain the desired reaction product in a single stage reaction. This product is then reacted with ammonia and heated as before to give the lubricating oil additive.

The reaction of hydrogen chloride and formaldehyde may also be conducted in the presence of an alcohol, for example, methyl alcohol, to give an alphachlor ether. This may be done by passing dry HCl into a suspension of paraformaldehyde in the alcohol. This ether may be reacted with the alkyl phenol by heating with or without a catalyst such as zinc chloride, to give the alkyl hydroxy benzyl chloride, the original alcohol being formed as a by-product.

Also, the alkyl phenol may be converted to the sodium salt and this salt, with no excess alkali present, may then be caused to react with an aldehyde to give an alkylol derivative. This may be converted to the chloride by reaction with hydrogen chloride. Either the alkylol derivative or the resulting halide derivative may then be reacted with ammonia and heated as in Example 1 to give an oil-soluble product suitable for use in this invention. This is illustrated in the following example:

EXAMPLE 2

A molal ratio of iso-octyl phenol (tetramethyl butyl phenol) and of sodium hydroxide are dissolved in water containing sufficient alcohol to dissolve the resulting sodium phenolate. The use of about 2 volumes of water and two-thirds volume of methyl alcohol per volume of phenol is sufficient for this purpose. Three mols of formaldehyde (in the form of Formalin containing 37% CH₂O) is added to this solution and the mixture allowed to stand for about 48 hours at room temperature, the reaction proceeding with the formation of the dimethylol derivative. The reaction mixture is then neutralized with acetic acid or any suitable mineral acid and the liberated bis hydroxy methyl iso-octyl phenol separates as an upper layer and may be used directly as such or after purification. To form the dichloride, the bis hydroxy methyl iso-octyl phenol is contacted with concentrated aqueous hydrogen chloride, or dry HCl may be passed through a solution of the compound in a suitable solvent such as benzene, carbon tetrachloride, chloroform, etc.

The reaction with ammonia may be carried out by adding an excess of ammonia, dissolved in isopropyl alcohol, to a solution of the hydroxy methyl iso-octyl phenol or of the corresponding chloride in a solvent such as benzene. This reaction with ammonia is quite violent at first and is conducted in the same manner as described in Example 1. When the addition of ammonia is completed, the reaction mixture is sealed in a bomb and heated at 110 to 120° C. for about 18 to 24 hours. The mixture is then washed with water to remove isopropyl alcohol and ammonium chloride and the benzene solvent is then evaporated to recover the complex reaction product which is a brittle solid resin, readily soluble in asphaltic and mixed base lubricating oils and soluble in turbine oils of high viscosity index at temperatures above about 60 to 70° C.

It is also possible to conduct the reaction of the phenol-formaldehyde and ammonia directly in a single stage by placing a mixture of suitable proportions of these reagents in a bomb and heating it, for example, at about 110° to 140° C. for about 15 to 20 hours. The proportions of reagents are preferably similar to those used in the processes described above, at least a molal equivalent of formaldehyde and of ammonia being used per mol of phenol. The ammonia is preferably in excess, some remaining at the end of the reaction. This is illustrated in the following example:

EXAMPLE 3

A stainless steel bomb was charged with 51.5 grams of iso-octylphenol. Then 20 grams of 37% strength aqueous formaldehyde and 25 cc. of concentrated aqueous ammonia were added and the bomb was quickly sealed. It was then heated to 120° C. and held at this temperature for 16 hours. The bomb was then cooled, opened and the reaction mixture poured into water and extracted with ether. The ether extract was washed free of ammonia and was dried over sodium sulfate. Ether was then evaporated, leaving 50.5 grams of a soft red resin which contained 1.3% nitrogen.

*Turbine oil corrosion test*

To a highly refined turbine oil, which gave evidence of severe corrosion in the presence of 1% of water in this test, there was added 0.1% by weight of the resinous product obtained in Example 2. This blend, in the same test, showed only slight corrosion and was substantially as effective as the best anti-corrodants now known.

The turbine oil corrosion test is conducted by suspending a test piece of clean steel by an enameled wire in a bath of the oil to be tested. The oil is maintained at 140° F. in a Pyrex glass container and is vigorously stirred with a glass stirrer for at least 8 hours of each day of the test. One percent of distilled water (based on the oil volume) is added to the oil one-half hour after the start of the test. The test is continued for 4⅓ days, and the steel test piece is then removed and examined for rusting and pitting as evidence of corrosion.

EXAMPLE 4

A stainless steel bomb was charged with 150 cc. of absolute ethyl alcohol and 7.5 grams of trioxymethylene. The solution was then saturated with ammonia gas at 0° C. and the trioxymethylene dissolved during the process of saturation, 17.5 grams of ammonia being absorbed. 55.5 grams of isooctylphenol were then added, the bomb was quickly closed and then heated at 110° C. for 20 hours. The bomb was then cooled, opened and the reaction mixture poured into water and extracted with ether. The ether extract was washed free of ammonia with water and then dried over sodium sulfate. On evaporation of the ether, 62 grams of a soft light colored resin was obtained, which upon analysis was found to contain 2.52% nitrogen. This material was then heated at 200° C. for one-half hour under 3 mm. absolute pressure. Upon cooling the heated product, a brittle resin was obtained which had a nitrogen content of 0.56%. This material was then blended in 0.1% concentration with a turbine oil which normally gave heavy corrosion in the turbine oil corrosion test. The blend showed only very slight corrosion and this additive was also substantially as effective as the best anticorrodants now known.

Primary and secondary amines and substituted amines such as diethyl amine, diamyl amine, piperidine, aniline, diphenyl amine, substituted amines such as ethanol amine, and the like may be substituted for the ammonia in any of the above described processes to prepare similar amine condensation products. These upon heating also undergo further condensation and polymerization and the complex resinous products thus obtained may also be used as lubricating oil improving agents.

Similarly, more complex derivatives of hydroxy benzyl chloride may be prepared by any suitable methods and may be reacted with ammonia or a primary or secondary amine and heated to secure resinous condensation and polymerization products suitable for use in this invention. Examples of such hydroxy benzyl chlorides are

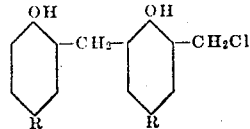

and

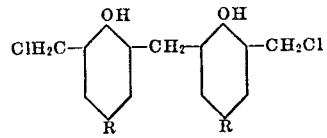

Hydroxy benzyl amines such as those having the characteristic structure

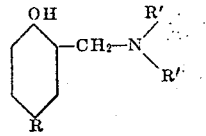

may also be heated to produce resinous condensation products suitable for use as lubricating oil improvement agents in this invention. In the above formulae the substituents may be linked to any position of the aryl nucleus, and the radicals R and R' have the same significance as in the formulae previously described. This is illustrated by the following example:

EXAMPLE 5

Diethyl amino methyl-isooctyl phenol, $(C_2H_5)_2NCH_2.C_8H_{17}C_6H_3OH$ was prepared by reaction of equimolal amounts of ethoxy methyl diethyl amine $(C_2H_5)_2NCH_2OC_2H_5$ with isooctyl phenol at the temperature of the steam bath for 24 hours. The product was distilled under 3 mm. mercury absolute pressure, obtaining about equal amounts of a clear liquid distillate fraction at 163 to 165° C. and a residue which was a yellow, transparent, hard resin. This resin was found to be active as an anticorrodant in the turbine oil corrosion test, although it was not as effective as the products of Examples 3 and 4.

The phenols used in any of the above described processes include generally all nuclearly hydroxylated aromatic compounds having phenolic properties and a readily replaceable nuclear hydrogen atom which is preferably either ortho or para to the hydroxyl group. Phenols extracted from petroleum oils may also be used as obtained or after alkylation. Also, other naturally occurring phenols such as those found in vegetable oils, for example, cardanol, obtained from cashew nuts, may be used. As indicated above, it is preferred that the phenols contain an alkyl group of at least 2, and preferably 4 or more carbon atoms attached to the nucleus. This may be accomplished by alkylating any of the above-described phenols which do not already contain suitable alkyl groups. The alkyl phenols may be prepared by alkylation of phenols with olefins, including mixtures of olefins such as obtained in cracked petroleum fractions, and by alkylation of phenols with alkyl halides, including chlorinated paraffin wax and chlorinated petrolatums derived from petroleum. Such chlorinated waxes may contain dichlorides and polychlorides and may be used in alkylating phenols by the customary Friedel-Crafts type of synthesis to give complex alkylated phenols of high molecular weight in which several phenol radicals are linked by alkyl radicals in a single molecule. These high molecular weight complex alkyl phenolic products, when reacted with an aldehyde and a nitrogen base as described herein, give products which are effective in reducing the pour point of waxy oils and in raising the viscosity index of lubricating oils as well as in improving their lubricating properties such as film strength, and their stability and resistance to oxidation.

The invention thus contemplates the use as lubricating oil improving agents of high molecular weight resinous condensation and polymerization products of hydroxy-aryl-alkyl amines containing the characteristic structure

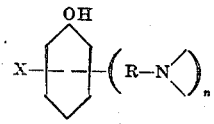

in which R is an alkyl linkage such as

in which R' represents either H or alkyl or aryl groups and may represent similar or different groups in the same molecule, $n$ represents a small whole number, and X represents hydrogen or an organic radical, especially an alkyl, aryl or aralkyl radical which may in turn contain substituent groups, such as a hydroxy alkyl benzyl radical. The desired compounds are also characterized by having at least four carbon atoms in alkyl groups joined to the aryl nucleus and/or to the amine radical (N≡) and are further characterized in having undergone a condensation reaction to produce a resinous, viscous liquid to solid product of high molecular weight which is soluble in hydrocarbon oils. In this, as in all the other structural formulae given in this application, the location of the substituent radicals in regard to the aryl nucleus is given merely as an illustration, and the various substituent radicals may be attached to any positions of the aryl nucleus, ortho, meta and/or para to the hydroxyl group and to each other. The preferred compounds for use according to this invention come within the above definition and are resinous condensation and polymerization products of materials having the characteristic structure

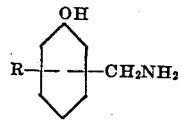

in which R is an alkyl group of at least 4 and preferably 5 to 20 or more carbon atoms, the compounds having undergone a condensation or polymerization reaction as described above.

Further illustrations of the use of the products described above as lubricating oil improving agents in accordance with this invention are presented in the following examples:

EXAMPLE 6

A highly refined S. A. E. 20 petroleum lubricating oil and a blend of the same oil containing 0.25% of a resinous condensation product of iso-octylhydroxy benzyl diethyl amine was subjected to an oxidation rate test in which oxygen was bubbled through a sample of the oil maintained at 200° C., the amount of oxygen absorbed during each 15-minute interval being recorded. The results of the two tests were as follows:

```
                              Oxidation rate
                           cc. O₂/15 minute interval
Blank oil _____ 29, 38, 37, 31
Blank oil plus additive_____ 11, 16, 16, 14
```

Thus the tendency of oils to become oxidized is greatly reduced by the addition of the improving agents of this invention, as indicated by the reduced rate of oxidation of the blend, as compared with the unblended oil, in the above test. This represents a substantial improvement, especially in regard to highly refined petroleum oils, for the oxidation of such oils results in acidic oxidation products which remain largely dissolved in the oil and thereby cause it to become corrosive, less resistant to emulsification and to become impaired in quality in regard to color, odor, taste and stability.

EXAMPLE 7

Alloy bearing corrosion tests were conducted by directing a stream of the oil under test at 325° F. against the polished surface of a copper lead alloy bearing of the type used in automobile connecting rod bearings. The oil was continuously recycled for a test period of eight hours, the bearings being repolished after the first four hours of the test. The total weight loss of the bearings in the two four-hour periods of the test was determined.

The results of three tests with a highly refined S. A. E. 20 petroleum lubricating oil and with blends of the same oil respectively with resinous condensation products of the ammonia derivative of chlormethyl diisobutyl phenol (I) and of the ammonia derivative of chlormethyl diamyl phenol (II) are given in the following table:

| Oil | Bearing Weight Loss in 8 Hours, Mgs. |
|---|---|
| Blank Oil | 140 |
| Blank Oil+0.25% I | 8 |
| Blank Oil+0.25% II | 40 |

The alloy bearings of the copper-lead, cadmium-silver and cadmium-nickel types are widely used in automobile engines and have been found much more susceptible to corrosion by ordinary crankcase lubricants than the ordinary Babbitt metal bearings. Lubricating oils normally corrosive to such bearings are rendered much less corrosive by the present invention, as indicated by the much smaller loss in weight of the bearings tested with the blended oils, as compared to the loss in weight of the bearing tested with the blank or unblended oil, in the above test.

EXAMPLE 8

Color stability tests were also conducted on a highly refined turbine oil having a Saybolt viscosity of 43 seconds at 210° F. and on blends of this oil with 0.005% of the resinous condensation product of diethyl amino methyl iso-octylphenol (I) and dicyclo hexyl amino methyl diamyl phenol (II). In this test, a four-ounce bottle is filled with the test oil and placed in an oven maintained at 250° F. for 16 hours. The oil is then allowed to cool and its Robinson color is measured, this value designates the color hold.

The color drop is the difference between this value and that of the original oil.

The results of these tests are given in the following table:

| Oil | Original Color | Color Hold | Color Drop |
|---|---|---|---|
| Blank Oil | 14 | 4.5 | 9.5 |
| Blank Oil+I | 15.5 | 9.25 | 6.25 |
| Blank Oil+II | 16 | 9.25 | 6.75 |

A comparison of both the color hold and the color drop of the blended oils with the same observations on the blank oil in this test demonstrates the effectiveness of the improving agents of this invention in preventing the deterioration in color of relatively light colored refined oils.

A further advantage of the improving agents of this invention is that they are soluble in highly paraffinic lubricating oils and may be used to prepare improved lubricants with highly refined petroleum base oils and greases having a viscosity index of 80 to 103 and even higher. Such oils may be obtained directly as distillate and residual fractions of paraffin base lubricants or by suitable refining, such as solvent extraction, hydrogenation and the like of lower quality lubricating oil fractions such as those obtained from mixed base and asphaltic base crudes. Oils of viscosity indices below 80 may, of course, also be used. The viscosity and viscosity index of the base lubricating oils used in preparing the improved lubricants of the present invention may thus be selected in regard to the particular service for which the blended lubricant is intended. Thus, these oils may be obtained from various types of crudes such as paraffinic, naphthenic, asphaltic or mixed crudes and they may be either plain distillates or fractions obtained by treating or refining of distillate of residual fractions by the various methods known to the art such as acid treating, clay treating, solvent extraction, dewaxing, etc. or they may be synthetic hydrocarbon oils resulting from various types of chemical reactions such as cracking, polymerization, condensation and the like. The present invention thus applies to the preparation of improved crankcase engine lubricants, turbine oils, highly refined light colored and white oils, as well as steam cylinder oils, gear oils, extreme pressure lubricants and greases, upper cylinder lubricants, slushing oils and the like.

While the complex condensation and polymerization products of hydroxyaryl-alkyl amines are especially useful for improving mineral lubricating oils, these materials may also be used as improving agents in other hydrocarbon oils and products such as waxes, fuel oils, Diesel fuels, naphthas, gasoline, burning oil and the like. These materials may also be used as oxidation inhibitor improving agents in other products derived from petroleum oils and in different types of products such as fatty oils, soaps, aldehydes, resins, rubber, synthetic rubber, paper and in the various synthetic products which tend to deteriorate by oxidation either alone or in accompaniment with other chemical phenomena.

As indicated above, the improving agents of this invention are added to hydrocarbon oils, especially lubricating oils, in concentrations sufficient to be effective for the particular purpose desired, whether it be oxidation inhibiting, corrosion inhibiting, color stabilization, or other purpose, and the concentrations vary somewhat for best results. Generally, concentrations as low as 0.001% are effective for stabilizing color, although larger amounts are not excluded, and concentrations ranging from about 0.01% to 1% and even up to 5% or 10% or more are useful in inhibiting corrosion and for other purposes.

If desired, other known addition agents or lubricant improving agents may be incorporated in the lubricants prepared according to the present invention. These include the fatty acid and naphthenic acid soaps, which may be used in small amounts in the preparation of liquid oil compositions or in larger amounts in the preparation of greases, including both the anhydrous types and those containing water. Other addition agents that may also be included are the fatty oils, synthetic esters, sulfur and halogen compounds and other agents for increasing oiliness and film strength, and various thickeners such as polyisobutylene having a molecular weight above 1,000, also pour depressants, other types of corrosion inhibitors, anti-oxidants, detergents, etc. such as the oil-soluble metal soaps especially of the alkaline earth metals, etc.

It is not intended that this invention be limited to any of the particular examples which have been presented only for purpose of illustration as it is intended to claim all novelty inherent in this invention as broadly as the prior art permits.

We claim:

1. Improved lubricant composition comprising a mineral lubricating oil and a small proportion of an oil-soluble resinous auto-condensation product of an alkyl hydroxy benzyl amine having the general compositional formula

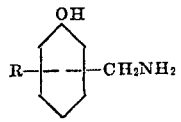

in which R represents an alkyl group of at least 4 carbon atoms.

2. A composition according to claim 1 in which R of the formula represents an alkyl group of 8 carbon atoms.

3. A composition according to claim 1 in which R of the formula represents an alkyl group of 8 carbon atoms situated in the para position with respect to the hydroxyl group.

LOUIS A. MIKESKA.
ALLEN R. KITTLESON.
WARREN M. SMITH.

REFERENCES CITED

The following references are of record in the file of this patent:

UNITED STATES PATENTS

| Number | Name | Date |
|---|---|---|
| 2,363,134 | McCleary | Nov. 21, 1944 |
| 2,348,638 | Mikeska | May 9, 1944 |
| 2,336,006 | Fuller | Dec. 7, 1943 |
| 2,308,282 | Howland | Jan. 12, 1943 |
| 2,282,513 | Downing | May 12, 1942 |
| 2,268,608 | McNulty | Jan. 6, 1942 |
| 2,255,597 | Downing | Sept. 9, 1941 |
| 2,223,411 | Fuller | Dec. 3, 1940 |
| 2,220,834 | Bruson | Nov. 5, 1940 |
| 2,114,122 | Bruson | Apr. 12, 1938 |
| 2,098,869 | Harmon | Nov. 9, 1937 |
| 1,594,983 | Somerville | Aug. 3, 1926 |